W. R. GILLIS.
Railway Rail-Joints.
No. 205,857. Patented July 9, 1878.
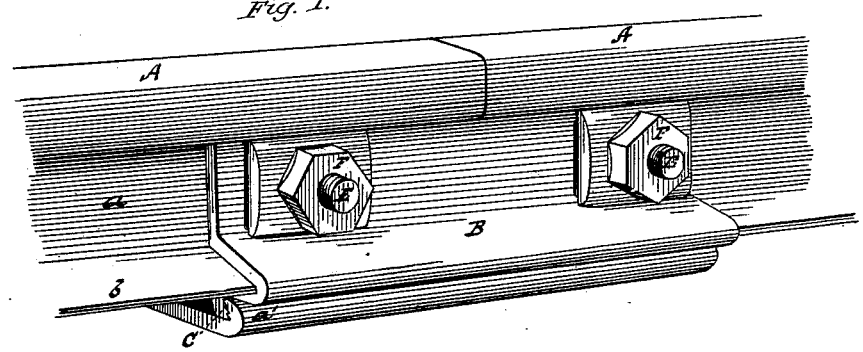
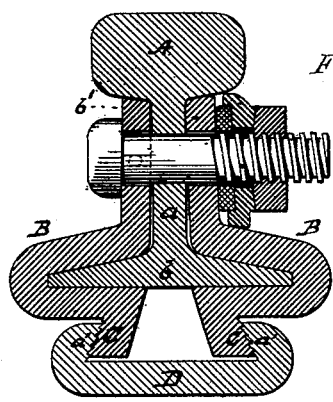
WITNESSES:
C. Clarence Poole
Geo. H. Evans
INVENTOR:
Walter R. Gillis
per atty
A. H. Evans & Co.

UNITED STATES PATENT OFFICE.

WALTER R. GILLIS, OF BOWLING GREEN, OHIO.

IMPROVEMENT IN RAILWAY-RAIL JOINTS.

Specification forming part of Letters Patent No. 205,857, dated July 9, 1878; application filed December 29, 1877.

*To all whom it may concern:*

Be it known that I, WALTER R. GILLIS, of Bowling Green, county of Wood, and State of Ohio, have invented certain new and useful Improvements in Railroad-Rail Joints, of which the following is a clear, full, and exact description, reference being had to the accompanying drawings, making a part of this specification, in which—

Figure 1 is a perspective view of a railroad-rail joint, with my improvements attached. Fig. 2 is a cross-section of the same.

This invention relates to improvements in railroad-rail joints, whereby they are adapted to be self tightening and adjusting; and the invention consists in the construction and combination of parts, all as hereinafter fully described.

To enable others skilled in the art to make and use my invention, I will proceed to describe the exact manner in which I have carried it out.

In the drawing, A A represent two sections of a T-rail to which my improvements are applied. B B represent two fish-plates, constructed as shown in Fig. 2, and between which the supporting-web $a$ and base-flange $b$ of the sections of the two rails are secured, which give the base of the rail a firm and unyielding rest.

The upper portions $b'$ of the fish-plates rest under the tread of the rails and are slightly inclined inward, so as to give direct bracing support to the inner portions of the head of the rail, thus preventing the brooming and lamination of the under tread of the rails at the joints. The lower portions of the fish-plates are provided with barbed or ribbed jaws C C, arranged at an angle to coincide with the barbed or ribbed jaws $a'$ $a'$ of the lock-bar D, within which the jaws of the fish-plates rest.

This construction of fish-plates and lock-bar allows said lock-bar, when the joint becomes worn or loosened by action of heat or cold, or the jar and shock of passing trains, to drop down by its own weight along the line of contact with the jaws of fish-plates, and close them together by the angle in which the jaws are set, and the barbed or ribbed surfaces of the jaws prevent the lock-bar from losing the advantage thus gained, always holding the fish-plates firmly together, and against tread and base of rail, keeping the tops and sides of the rails even and in exact line, thus preventing the crushing of the tread by the wheels striking the ends of the rails a blow, as is often the case, caused by the end of the rail upon which the wheel approaches being depressed by its weight. As long as these fish-plates last the tops and sides of the rails will be kept in same plane.

The form of the fish-plates above the base of the rail enables them to be drawn tighter and closer without coming in contact with the rails at any points except where it is necessary to combine strength and compactness.

Having thus described my invention, what I claim as new, and desire to secure by Letters Patent, is—

The combination, with the rails A A, of the fish-plates and lock-bar, provided with the angular and ribbed or barbed jaws, substantially as and for the purpose described.

WALTER R. GILLIS.

Witnesses:
S. U. CLAY,
HENRY MYERS.